United States Patent
Yang (10) Patent No.: US 10,802,939 B2
(45) Date of Patent: Oct. 13, 2020

(54) METHOD FOR SCANNING CACHE OF APPLICATION AND ELECTRONIC DEVICE

(71) Applicant: BEIJING KINGSOFT INTERNET SECURITY SOFTWARE CO., LTD., Beijing (CN)

(72) Inventor: Changmao Yang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 152 days.

(21) Appl. No.: 16/053,923

(22) Filed: Aug. 3, 2018

(65) Prior Publication Data
US 2019/0012248 A1    Jan. 10, 2019

Related U.S. Application Data

(63) Continuation of application No. PCT/CN2017/087632, filed on Jun. 8, 2017.

(30) Foreign Application Priority Data

Jun. 24, 2016  (CN) ...................... 2016 1 0474631.6

(51) Int. Cl.
*G06F 11/30*    (2006.01)
*G06F 9/50*    (2006.01)
(Continued)

(52) U.S. Cl.
CPC ........ *G06F 11/3037* (2013.01); *G06F 9/4818* (2013.01); *G06F 9/50* (2013.01);
(Continued)

(58) Field of Classification Search
CPC ........... G06F 11/3037; G06F 16/90335; G06F 16/252; G06F 9/4818; G06F 9/50; G06F 12/0891; G06F 12/0893
See application file for complete search history.

(56) References Cited

U.S. PATENT DOCUMENTS

| | | | | |
|---|---|---|---|---|
| 7,739,738 B1 * | 6/2010 | Sobel | .................. | G06F 12/0891 |
| | | | | 713/164 |
| 8,806,625 B1 * | 8/2014 | Berger | .................. | H04L 9/3236 |
| | | | | 711/118 |

(Continued)

FOREIGN PATENT DOCUMENTS

| | | |
|---|---|---|
| CN | 104778411 A | 7/2015 |
| CN | 106095587 A | 11/2016 |

OTHER PUBLICATIONS

International Search Report in corresponding International Application No. PCT/CN2017/087632 dated Sep. 14, 2017 (2 pages).

*Primary Examiner* — Ryan Bertram
(74) *Attorney, Agent, or Firm* — Osha Liang LLP (57) ABSTRACT

Disclosed are a method for scanning cache of an application, an electronic device and a computer-readable storage medium. The method may include: acquiring a list of applications to be scanned; querying a historical scanning record of each application in the list of applications to be scanned; determining a scanning priority of each application and whether the application needs to be scanned according to the historical scanning record of each application; scanning applications that need to be scanned in the list of applications to be scanned in a descending order of the scanning priorities, so as to acquire cache sizes of respective applications that need to be scanned; and scanning applications that need not to be scanned in the list of applications to be scanned in a descending order of the scanning priorities, so as to acquire cache sizes of respective applications that need not to be scanned.

11 Claims, 3 Drawing Sheets

(51) Int. Cl.
  *G06F 9/48*      (2006.01)
  *G06F 16/903*    (2019.01)
  *G06F 16/25*     (2019.01)
  *G06F 12/0891*   (2016.01)
  *G06F 12/0893*   (2016.01)

(52) U.S. Cl.
  CPC ........ *G06F 9/5016* (2013.01); *G06F 12/0891* (2013.01); *G06F 12/0893* (2013.01); *G06F 16/252* (2019.01); *G06F 16/90335* (2019.01)

(56) References Cited

U.S. PATENT DOCUMENTS

| | | | |
|---|---|---|---|
| 2006/0288159 A1* | 12/2006 | Haruna | G06F 12/0871 |
| | | | 711/113 |
| 2015/0081978 A1* | 3/2015 | Daly | G06F 12/0895 |
| | | | 711/133 |
| 2015/0134913 A1* | 5/2015 | Huang | G06F 12/0833 |
| | | | 711/135 |
| 2016/0124652 A1* | 5/2016 | Adamson | G06F 16/22 |
| | | | 711/171 |
| 2016/0335191 A1* | 11/2016 | Dong | G06F 12/0891 |
| 2017/0177492 A1* | 6/2017 | Loh | G06F 12/0842 |
| 2017/0293564 A1* | 10/2017 | Amer | G11C 11/417 |
| 2019/0050346 A1* | 2/2019 | Greenfield | G06F 12/123 |
| 2019/0220901 A1* | 7/2019 | Lee | H04L 67/2842 |

\* cited by examiner

METHOD FOR SCANNING CACHE OF APPLICATION AND ELECTRONIC DEVICE

CROSS REFERENCE TO RELATED APPLICATION

This application is a continuation of International Application No. PCT/CN2017/087632, filed on Jun. 8, 2017, which claims priority to and benefits of Chinese Patent Application No. 201610474631.6, filed with State Intellectual Property Office on Jun. 24, 2016 by BEIJING KINGSOFT INTERNET SECURITY SOFTWARE CO., LTD., which is entitled as "cache scanning method and apparatus for application program, and electronic device", the entire content of both of which are incorporated herein by reference.

FIELD

The present disclosure relates to cache cleaning technology field, and more particularly to a method and an apparatus for scanning cache of an application.

BACKGROUND

Usually, after a user installs an application on a mobile phone, there is a cache of the application on the mobile phone, which occupies the storage space of the mobile phone. In order to save storage space on the phone, the user usually performs a cache cleaning. When cleaning up the application's cache on the mobile phone, a scanning should be performed firstly to acquire a total cache size of the application, and then the cache is to be cleaned up after the scanning.

Currently, the mobile phone may acquire the total cache size of the application in following manners.

According to a list of applications installed on the Android mobile phone, a getPackageSizeInfo function is invoked for each application to obtain the cache size of each application, and the cache sizes of all applications are added up to obtain the total cache size.

As the phone will process a request internally when the getPackageSizeInfo function is invoked, the scanning time will be extremely long when there are several applications installed on the user's mobile phone.

SUMMARY

To this end, embodiments of the present disclosure provide a method for scanning cache of an application and an electronic device.

In order to solve the above objective, embodiments of the present disclosure apply the following technical solutions.

Embodiments of the present disclosure provide a method for scanning cache of an application. The method may include: acquiring a list of applications to be scanned; querying a historical scanning record of each application in the list of applications to be scanned; determining a scanning priority of each application and whether the application needs to be scanned according to the historical scanning record of each application; scanning applications that need to be scanned in the list of applications to be scanned in a descending order of the scanning priorities, so as to acquire cache sizes of respective applications that need to be scanned; and scanning applications that need not to be scanned in the list of applications to be scanned in a descending order of the scanning priorities, so as to acquire cache sizes of respective applications that need not to be scanned, and finishing the scanning until a preset scanning duration is reached or a preset scanning ending condition is satisfied.

Embodiments of the present disclosure provide an electronic device. The electronic device may include: a housing, a processor, a memory, a circuit board, a power supply circuit, in which, the circuit board is located in a space enclosed by the housing; the processor and the memory are positioned on the circuit board; the power supply circuit is configured to provide power for respective circuits or components of the electronic device; the memory is configured to store executable program codes; and the processor is configured to run a program corresponding to the executable program codes by reading the executable program codes stored in the memory, to perform any of the above-described methods for scanning cache of an application.

Embodiments of the present disclosure provide a storage medium, in which when instructions in the storage medium are executed by a processor, the processor is caused to perform the method for scanning cache of an application, including: acquiring a list of applications to be scanned; querying a historical scanning record of each application in the list of applications to be scanned; determining a scanning priority of each application and whether the application needs to be scanned according to the historical scanning record of each application; scanning applications that need to be scanned in the list of applications to be scanned in a descending order of the scanning priorities, so as to acquire cache sizes of respective applications that need to be scanned; and scanning applications that need not to be scanned in the list of applications to be scanned in a descending order of the scanning priorities, so as to acquire cache sizes of respective applications that need not to be scanned, and finishing the scanning until a preset scanning duration is reached or a preset scanning ending condition is satisfied.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

Embodiments of the present disclosure are hereinafter described with reference to accompanying drawings.

It should be noted that, the described embodiments are a part of embodiments of the present disclosure, but not all embodiments. All other embodiments obtained by those skilled in the art based on the embodiments in the present disclosure without creative labor shall fall in the protection scope of the present disclosure.

Figure 1:
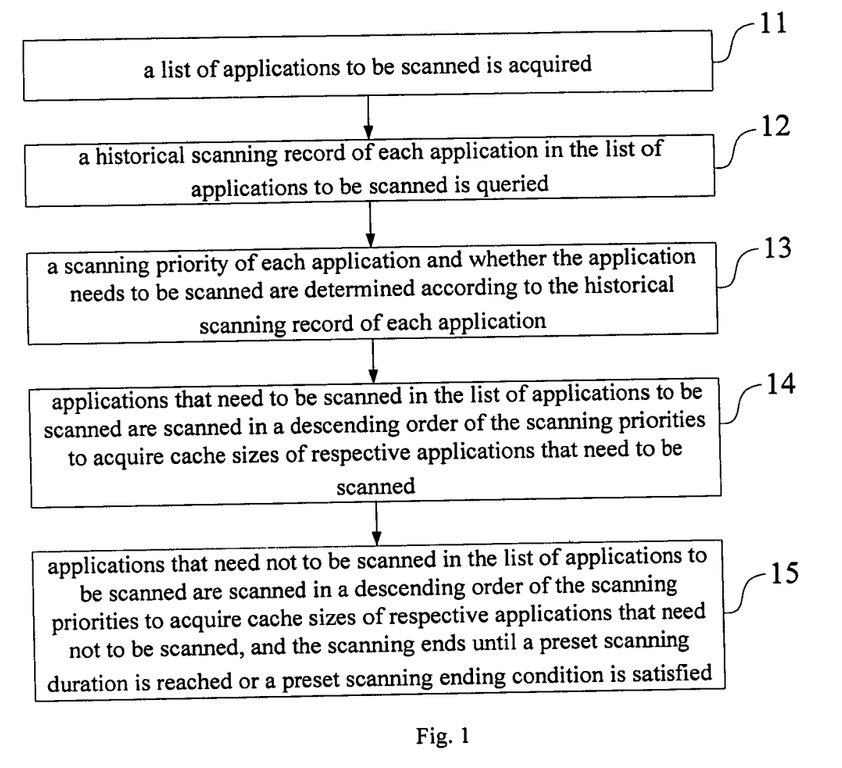
FIG. 1 is a flow chart of a method for scanning cache of an application according to an embodiment of the present disclosure.

FIG. 1 is a flow chart of a method for scanning cache of an application according to an embodiment of the present disclosure. As shown in FIG. 1, the method in this embodiment may include followings.

At block 11, a list of applications to be scanned is acquired.

In this embodiment, a list of applications installed on the electronic device may be acquired by invoking a system interface, and a package name of each application may be included in the list of applications.

At block 12, a historical scanning record of each application in the list of applications to be scanned is queried.

In this embodiment, a database is created on the electronic device to store the package name and the corresponding historical scanning record. The package name stored in the database corresponds to the package name in the list of the applications. According to the package name of each application, the historical scanning record corresponding to the package name may be queried in the database, so that the historical scanning record of each application may be obtained.

The historical scanning record may include a cache size and a time for a previous scanning and a number of successively skipped times.

For a certain application, the number of successively skipped times may be reset to zero after the scanning, and the number of successively skipped times adds one when the scanning is skipped.

At block 13, a scanning priority of each application and whether the application needs to be scanned are determined according to the historical scanning record of each application.

In this embodiment, the scanning priority of each application and whether the application needs to be scanned are determined in following manners.

It is determined that the application without the historical scanning record is to be preferentially scanned and needs to be scanned.

A first set of applications each with the cache size for the previous scanning greater than a preset cache size are compared, in which the application with a large cache size for the previous scanning in the first set of applications is preferentially scanned and needs to be scanned, and the scanning priorities of applications with the same cache size for the previous scanning in the first set of applications are the same. The preset cache size may be the maximum cache size for the previous scanning which can be skipped. In other words, a first set of applications each with the cache size for the previous scanning greater than a preset cache size are acquired, in which the applications each with the cache size for the previous scanning greater than the preset cache size need to be scanned and are to be scanned in a descending order of the cache sizes. The preset cache size may be set to 32 kb, for example.

A second set of applications each with the number of successively skipped times greater than a preset number are compared, in which the application with a great number of successively skipped times in the second set of applications is preferentially scanned and needs to be scanned, and the scanning priorities of applications with the same number of successively skipped times in the second set of applications are the same. In other words, a second set of applications each with the number of successively skipped times greater than a preset number are acquired, in which the applications each with the number of successively skipped times greater than the preset number need to be scanned and are to be scanned in a descending order of the numbers of successively skipped times. The preset number is a maximum number of successively skipped times, which has a default value of 3.

A third set of applications each with a time difference between a present time and the time for the previous scanning greater than a preset time interval are compared, in which the application with a great time difference in third set of applications is preferentially scanned and needs to be scanned, and the scanning priorities of applications with the same time difference in the third set of applications are the same. The preset time interval is a maximum time interval for which the scanning can be skipped. In other words, a third set of applications each with a time difference between a present time and the time for the previous scanning greater than a preset time interval are acquired, in which the applications each with the time difference greater than the preset time interval need to be scanned and are to be scanned in a descending order of the time differences. The preset time interval may be set to 7 days.

A fourth set of applications each with the cache size for the previous scanning smaller than or equal to the preset cache size are compared, in which the application with a large cache size for the previous scanning in the fourth set of applications is preferentially scanned and needs not to be scanned, and the scanning priorities of applications with the same cache size for the previous scanning in the fourth set of applications are the same. In other words, a fourth set of applications each with the cache size for the previous scanning smaller than or equal to the preset cache size are acquired, in which the applications each with the cache size for the previous scanning smaller than or equal to the preset cache size need not to be scanned and are to be scanned in a descending order of the cache sizes if the applications in the fourth set of applications are to be scanned.

A fifth set of applications each with the number of successively skipped times smaller than or equal to the preset number are compared, in which the application with a great number of successively skipped times in the fifth set of applications is preferentially scanned and needs not to be scanned, and the scanning priorities of applications with the same number of successively skipped times in the fifth set of applications are the same. In other words, a fifth set of applications each with the number of successively skipped times smaller than or equal to the preset number are acquired, in which the applications each with the number of successively skipped times smaller than or equal to the preset number need not to be scanned and are to be scanned in a descending order of the numbers of successively skipped times if the applications in the fifth set of applications are to be scanned.

It is determined that the scanning priorities of a sixth set of applications in the list of applications to be scanned and beyond the first to fifth sets of applications are the same and the sixth set of applications need not to be scanned.

At block 14, applications that need to be scanned in the list of applications to be scanned are scanned in a descending order of the scanning priorities to acquire cache sizes of respective applications that need to be scanned.

In this embodiment, for electronic devices installed with Android system, when scanning the applications, the cache size of the application may be acquired by invoking the getPackageSizeInfo function.

At block 15, applications that need not to be scanned in the list of applications to be scanned are scanned in a descending order of the scanning priorities to acquire cache sizes of respective applications that need not to be scanned, and the scanning ends until a preset scanning duration is reached or a preset scanning ending condition is satisfied.

In this embodiment, when scanning the application that needs not to be scanned in the list of the applications, it is determined whether the preset scanning duration is reached, if yes, the scanning ends; otherwise, it is determined whether the preset scanning ending condition is met, and if yes, the scanning ends; otherwise, the cache size of the application that needs not to be scanned is obtained.

The preset scanning duration may be set to 10 seconds.

In this embodiment, a scanning priority of each application and whether the application needs to be scanned may be determined according to a historical scanning record of each application in a list of applications to be scanned. Applications that need to be scanned in the list of applications to be scanned are scanned in a descending order of the scanning priorities to acquire cache sizes of respective applications that need to be scanned. Applications that need not to be scanned in the list of applications to be scanned are scanned in a descending order of the scanning priorities to acquire cache sizes of respective applications that need not to be scanned. The scanning ends until a preset scanning duration is reached or a preset scanning ending condition is satisfied. Compared to the prior art, according to the present disclosure, after the application that needs to be scanned are scanned, the application that need not to be scanned may be stopped to be scanned and the scanning may be stopped according to the practical situation in any time, such that the time duration of scanning may be shortened without affecting the scanning results.

Figure 2:
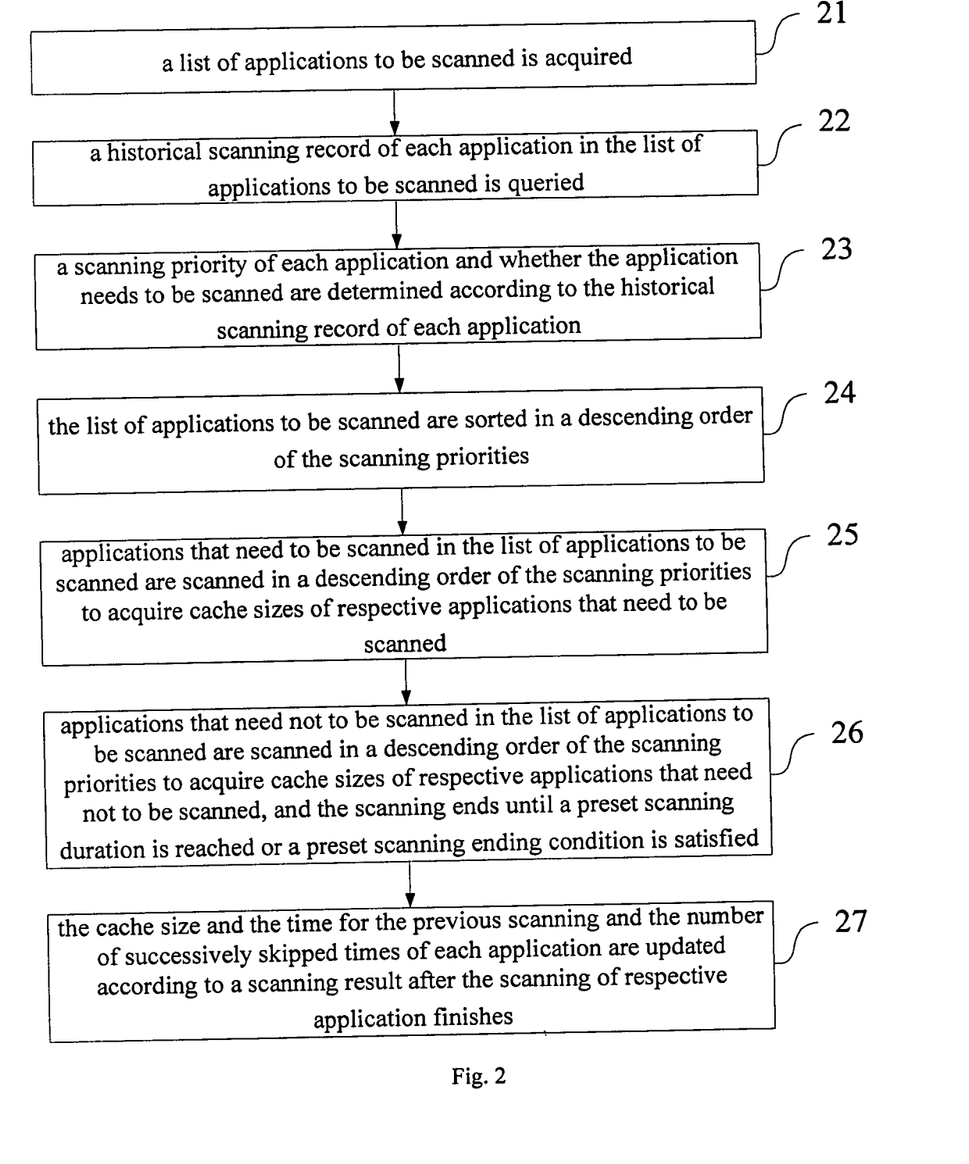
FIG. 2 is a flow chart of a method for scanning cache of an application according to an embodiment of the present disclosure.

FIG. 2 is a flow chart of a method for scanning cache of an application according to an embodiment of the present disclosure. As shown in FIG. 2, the method in this embodiment may include followings.

At block 21, a list of applications to be scanned is acquired.

In this embodiment, the process of acquiring the list of applications to be scanned is similar to the act in block 11, which will not be described in detail herein.

At block 22, a historical scanning record of each application in the list of applications to be scanned is queried.

In this embodiment, the process of querying the historical scanning record of each application in the list of applications to be scanned is similar to the act in block 12, which will not be described in detail herein.

At block 23, a scanning priority of each application and whether the application needs to be scanned are determined according to the historical scanning record of each application.

In this embodiment, the process of determining the scanning priority of each application and whether the application needs to be scanned according to the historical scanning record of each application is similar to the act in block 13, which will not be described in detail herein.

At block 24, the list of applications to be scanned are sorted in a descending order of the scanning priorities.

In this embodiment, in order to scan applications with same priorities, the application which is sorted ahead in the original order is sorted in the front of the scanning row.

At block 25, applications that need to be scanned in the list of applications to be scanned are scanned in a descending order of the scanning priorities to acquire cache sizes of respective applications that need to be scanned.

In this embodiment, the process of scanning applications that need to be scanned in the list of applications to be scanned in a descending order of the scanning priorities to acquire cache sizes of respective applications that need to be scanned is similar to the act in block 14, which will not be described in detail herein.

At block 26, applications that need not to be scanned in the list of applications to be scanned are scanned in a descending order of the scanning priorities to acquire cache sizes of respective applications that need not to be scanned, and the scanning ends until a preset scanning duration is reached or a preset scanning ending condition is satisfied.

In this embodiment, the process of scanning the applications that need not to be scanned in the list of applications to be scanned in a descending order of the scanning priorities to acquire cache sizes of respective applications that need not to be scanned is similar to the act in block 15, which will not be described in detail herein.

At block 27, the cache size and the time for the previous scanning and the number of successively skipped times of each application are updated according to a scanning result after the scanning of respective application finishes.

In this embodiment, the cache size and the time for the previous scanning and the number of successively skipped times of the application stored in the database are updated according to the cache size and the time for the previous scanning and the number of successively skipped times for the scanned application, for the next scanning.

In this embodiment, a scanning priority of each application and whether the application needs to be scanned may be determined according to a historical scanning record of each application in a list of applications to be scanned. Applications that need to be scanned in the list of applications to be scanned are scanned in a descending order of the scanning priorities to acquire cache sizes of respective applications that need to be scanned. Applications that need not to be scanned in the list of applications to be scanned are scanned in a descending order of the scanning priorities to acquire cache sizes of respective applications that need not to be scanned. The scanning ends until a preset scanning duration is reached or a preset scanning ending condition is satisfied. The cache size and the time for the previous scanning and the number of successively skipped times of each application are updated according to a scanning result after the scanning of respective application finishes. Compared to the prior art, according to the present disclosure, after the application that needs to be scanned are scanned, the application that need not to be scanned may be stopped to be scanned and the scanning may be stopped according to the practical situation in any time, such that the time duration of scanning may be shortened without affecting the scanning results. In addition, the historical scanning record is updated after the scanning finishes for the next scanning, such that the scanning accuracy may be ensured.

Figure 3:
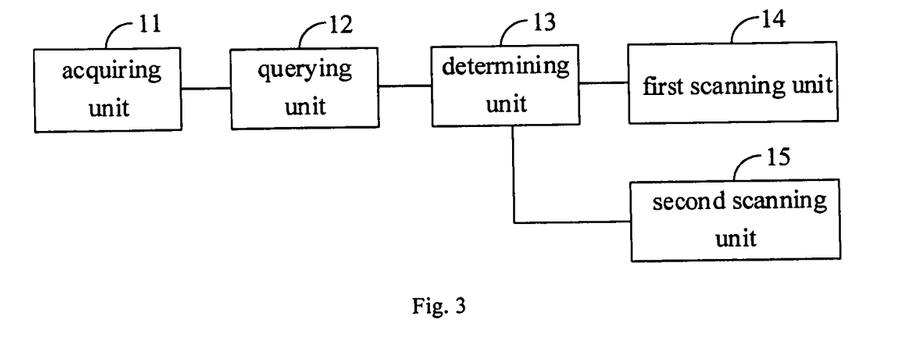
FIG. 3 is a structure diagram of an apparatus for scanning cache of an application according to an embodiment of the present disclosure.

FIG. 3 is a structure diagram of an apparatus for scanning cache of an application according to an embodiment of the present disclosure. As shown in FIG. 3, the apparatus in this embodiment may include: an acquiring unit 11, a querying unit 12, a determining unit 13, a first scanning unit 14 and a second scanning unit 15. The acquiring unit 11 is configured to acquire a list of applications to be scanned. The querying unit 12 is configured to query a historical scanning record of each application in the list of applications to be scanned. The determining unit 13 is configured to determine a scanning priority of each application and whether the application needs to be scanned according to the historical scanning record of each application. The first scanning unit 14 is configured to scan applications that need to be scanned in the list of applications to be scanned in a descending order of the scanning priorities, so as to acquire cache sizes of respective applications that need to be scanned. The second scanning unit 15 is configured to scan applications that need not to be scanned in the list of applications to be scanned in a descending order of the scanning priorities, so as to acquire cache sizes of respective applications that need not to be scanned, and to finish the scanning until a preset scanning duration is reached or a preset scanning ending condition is satisfied.

The apparatus in this embodiment is configured to perform the technical solution described in the method embodiment illustrated in FIG. 1. The implementing principles and technical effects for the apparatus and the method are similar, which will not be described in detail herein.

In an embodiment, the historical scanning record may include a cache size and a time for a previous scanning and a number of successively skipped times.

Further, the determining unit 13 is configured to determine that the application without the historical scanning record is to be preferentially scanned and needs to be scanned; compare a first set of applications each with the cache size for the previous scanning greater than a preset cache size, in which the application with a large cache size for the previous scanning in the first set of applications is preferentially scanned and needs to be scanned, and the scanning priorities of applications with the same cache size for the previous scanning in the first set of applications are the same; compare a second set of applications each with the number of successively skipped times greater than a preset number, in which the application with a great number of successively skipped times in the second set of applications is preferentially scanned and needs to be scanned, and the scanning priorities of applications with the same number of successively skipped times in the second set of applications are the same; compare a third set of applications each with a time difference between a present time and the time for the previous scanning greater than a preset time interval, in which the application with a great time difference in third set of applications is preferentially scanned and needs to be scanned, and the scanning priorities of applications with the same time difference in the third set of applications are the same; compare a fourth set of applications each with the cache size for the previous scanning smaller than or equal to the preset cache size, in which the application with a large cache size for the previous scanning in the fourth set of applications is preferentially scanned and needs not to be scanned, and the scanning priorities of applications with the same cache size for the previous scanning in the fourth set of applications are the same; compare a fifth set of applications each with the number of successively skipped times smaller than or equal to the preset number, in which the application with a great number of successively skipped times in the fifth set of applications is preferentially scanned and needs not to be scanned, and the scanning priorities of applications with the same number of successively skipped times in the fifth set of applications are the same; and determine that the scanning priorities of a sixth set of applications in the list of applications to be scanned and beyond the first to fifth sets of applications are the same and the sixth set of applications need not to be scanned.

Figure 4:
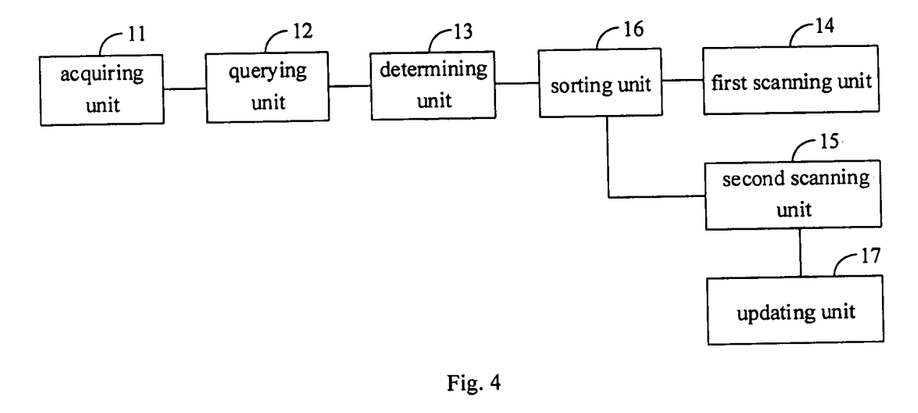
FIG. 4 is a structure diagram of an apparatus for scanning cache of an application according to an embodiment of the present disclosure.

FIG. 4 is a structure diagram of an apparatus for scanning cache of an application according to an embodiment of the present disclosure. As shown in FIG. 4, based on the structure of the apparatus illustrated in FIG. 3, the apparatus in this embodiment may also include a sorting unit 16, configured to sort the list of applications to be scanned in a descending order of the scanning priorities after the determining unit 13 determines a scanning priority of each application and whether the application needs to be scanned according to the historical scanning record of each application.

Further, the apparatus may also include an updating unit 17, configured to update the cache size and the time for the previous scanning and the number of successively skipped times of each application according to a scanning result after the scanning of respective application finishes.

In an embodiment, the querying unit 12 is configured to query the historical scanning record corresponding to a package name of each application according to the package name of each application.

The apparatus may be configured to perform the technical solution of the method embodiments illustrated in FIG. 1 and FIG. 2. The implementing principles and technical effects for the apparatus and the method are similar, which will not be described in detail herein.

In should be noted that, in this description, relation terms such as first and second and the like is merely used to distinguish an object or operation from another object or operation, and it is not necessary to require or imply that there is any real relations or order among these objects or operations. Furthermore, terms "comprise", "include" or any other modifications are aim at covering non-exclusive "include", such that a process, a method, a term or a device including a series of elements also includes other elements which are not listed definitely. Without further limitation, an element defined by a sentence "include a . . . " may not exclusive of other same elements included in the process, the method, the term or the device including the said element.

The various embodiments in the present specification are described in a related manner, and the same or similar parts between the various embodiments may be referred to each other, and each embodiment focuses on the differences from the other embodiments.

In particular, since the apparatus embodiment is basically similar to the method embodiment, the description is relatively simple, and the relevant parts can be referred to the description of the method embodiment.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination.

In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Embodiments of the present disclosure also provide an electronic device. The electronic device may include any of apparatuses in the above-described embodiments.

Figure 5:
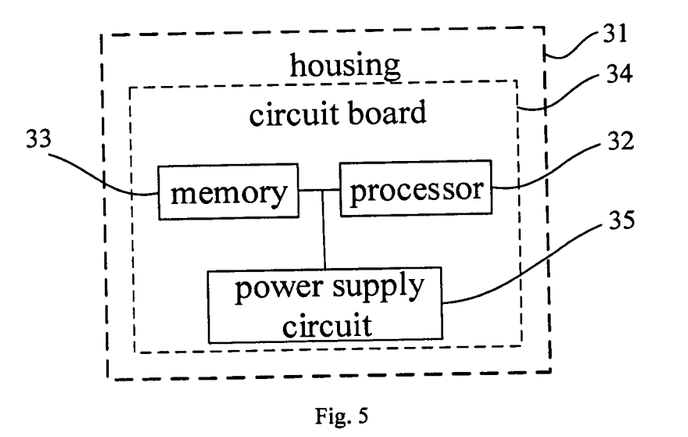
FIG. 5 is a structure diagram of an electronic device according to an embodiment of the present disclosure.

FIG. 5 is a structure diagram of an electronic device according to an embodiment of the present disclosure. The electronic device may realize the method flow of the embodiments illustrated in FIG. 1 or FIG. 2. As shown in FIG. 5, the above-described electronic device may include a housing 31, a processor 32, a memory 33, a circuit board 34 and a power supply circuit 35, in which the circuit board 34 is located in a space enclosed by the housing 31, the processor 32 and the memory 33 are positioned on the circuit board 34, the power supply circuit 35 is configured to provide power for respective circuits or components of the electronic device, the memory 33 is configured to store executable program codes, and the processor 32 is configured to run a program corresponding to the executable program codes by reading the executable program codes stored in the memory 33, to perform any of the above-described methods for scanning cache of an application.

The specific implementation process of the above steps performed by the processor 32 or by the processor performing executable program codes may refer to the description of the embodiments illustrated in FIG. 1 or FIG. 2, which will not be described in detail herein.

The electronic device may exist in various forms, including but not be limited to the followings.

(1) Mobile communication equipment, which is characterized by its mobile communication function and is mainly aimed at providing voice and data communication. Such terminals include: smart phones (such as iPhone), multimedia phones, functional phones, and low-end phones.

(2) Ultra-mobile PC devices, which belong to the category of personal computers, have computing and processing functions, and generally have mobile Internet access. Such terminals include: PDAs, MIDs, and UMPC devices, such as the iPad.

(3) Portable entertainment devices, which can display and play multimedia content. Such devices include: audio/video players (such as iPod), handheld game consoles, e-books, and smart toys and portable car navigation devices.

(4) Server, a device that provide computing services, consists of a processor, a hard disk, a memory, a system bus, etc. The server is similar to a general computer architecture, but because of the need to provide highly reliable services, processing power and stability High reliability in terms of reliability, security, scalability, and manageability.

(5) Other electronic devices with data interaction capabilities.

A person skilled in the art may understand that all or a part of the process of implementing the above method embodiments may be performed by a computer program to instruct related hardware, and the program may be stored in a computer readable storage medium. When the program is executed, the flow of embodiments of the methods as described above may be included. The storage medium may be a magnetic disk, an optical disk, a read-only memory (ROM), or a random access memory (RAM).

The above description is merely specific embodiments of the present disclosure, the scope of the present disclosure is not limited thereto. Various changes and modifications of the present disclosure may be made without departing from the spirit and scope of the present disclosure should be included in the scope of the present disclosure. Therefore, the scope of the disclosure should be determined by the scope of the claims.

What is claimed is:

1. A method for scanning cache of an application installed on an electronic device that comprises a processor and a memory, the method comprising:

acquiring, by the processor, a list of applications to be scanned by invoking a system interface installed on the electronic device;

querying, by the processor and in a database stored in the memory, a historical scanning record of each application in the list of applications to be scanned;

determining, by the processor, a scanning priority of each application and whether the application needs to be scanned according to the historical scanning record of each application;

scanning, by the processor, applications that need to be scanned in the list of applications to be scanned in a descending order of the scanning priorities, so as to acquire cache sizes of respective applications that need to be scanned; and scanning, by the processor, applications that need not to be scanned in the list of applications to be scanned in a descending order of the scanning priorities, so as to acquire cache sizes of respective applications that need not to be scanned, and finishing the scanning until a preset scanning duration is reached or a preset scanning ending condition is satisfied, wherein the historical scanning record comprises a cache size and a time for a previous scanning and a number of successively skipped times.

2. The method according to claim 1, wherein determining the scanning priority of each application and whether the application needs to be scanned according to the historical scanning record of each application comprises:

determining that the application without the historical scanning record is to be preferentially scanned and needs to be scanned;

acquiring a first set of applications each with the cache size for the previous scanning greater than a preset cache size, in which the applications each with the cache size for the previous scanning greater than the preset cache size need to be scanned and are to be scanned in a descending order of the cache sizes, and the scanning priorities of applications with the same cache size for the previous scanning in the first set of applications are the same;

acquiring a second set of applications each with the number of successively skipped times greater than a preset number, in which the applications each with the number of successively skipped times greater than the preset number need to be scanned and are to be scanned in a descending order of the numbers of successively skipped times, and the scanning priorities of applications with the same number of successively skipped times in the second set of applications are the same;

acquiring a third set of applications each with a time difference between a present time and the time for the previous scanning greater than a preset time interval, in which the applications each with the time difference greater than the preset time interval need to be scanned and are to be scanned in a descending order of the time differences, and the scanning priorities of applications with the same time difference in the third set of applications are the same;

acquiring a fourth set of applications each with the cache size for the previous scanning smaller than or equal to the preset cache size, in which the applications each with the cache size for the previous scanning smaller than or equal to the preset cache size need not to be scanned and are to be scanned in a descending order of the cache sizes if the applications in the fourth set of applications are to be scanned, and the scanning priorities of applications with the same cache size for the previous scanning in the fourth set of applications are the same;

acquiring a fifth set of applications each with the number of successively skipped times smaller than or equal to the preset number, in which the applications each with the number of successively skipped times smaller than or equal to the preset number need not to be scanned and are to be scanned in a descending order of the numbers of successively skipped times if the applications in the fifth set of applications are to be scanned, and the scanning priorities of applications with the same number of successively skipped times in the fifth set of applications are the same; and determining that the scanning priorities of a sixth set of applications in the list of applications to be scanned and beyond the first to fifth sets of applications are the same and the sixth set of applications need not to be scanned.

3. The method according to claim 2, wherein after determining the scanning priority of each application and whether the application needs to be scanned according to the historical scanning record of each application, the method further comprises:

sorting the list of applications to be scanned in a descending order of the scanning priorities.

4. The method according to claim 2, further comprising:
updating the cache size and the time for the previous scanning and the number of successively skipped times of each application according to a scanning result after the scanning of respective application finishes.

5. The method according to claim 1, wherein querying the historical scanning record of each application in the list of applications to be scanned comprises:

querying the historical scanning record corresponding to a package name of each application according to the package name of each application.

6. An electronic device, comprising: a housing, a processor, a memory, a circuit board, a power supply circuit, wherein, the circuit board is located in a space enclosed by the housing; the processor and the memory are positioned on the circuit board; the power supply circuit is configured to provide power for respective circuits or components of the electronic device; the memory is configured to store executable program codes; and the processor is configured to run a program corresponding to the executable program codes by reading the executable program codes stored in the memory, to perform the method for scanning cache of an application installed on the electronic device, the method comprising:

acquiring, by the processor, a list of applications to be scanned by invoking a system interface installed on the electronic device;

querying, by the processor and in a database stored in the memory, a historical scanning record of each application in the list of applications to be scanned;

determining, by the processor, a scanning priority of each application and whether the application needs to be scanned according to the historical scanning record of each application;

scanning, by the processor, applications that need to be scanned in the list of applications to be scanned in a descending order of the scanning priorities, so as to acquire cache sizes of respective applications that need to be scanned; and scanning, by the processor, applications that need not to be scanned in the list of applications to be scanned in a descending order of the scanning priorities, so as to acquire cache sizes of respective applications that need not to be scanned, and finishing the scanning until a preset scanning duration is reached or a preset scanning ending condition is satisfied, wherein the historical scanning record comprises a cache size and a time for a previous scanning and a number of successively skipped times.

7. The electronic device according to claim 6, wherein the processor is further configured to:

determine that the application without the historical scanning record is to be preferentially scanned and needs to be scanned;

acquire a first set of applications each with the cache size for the previous scanning greater than a preset cache size, in which the applications each with the cache size for the previous scanning greater than the preset cache size need to be scanned and are to be scanned in a descending order of the cache sizes, and the scanning priorities of applications with the same cache size for the previous scanning in the first set of applications are the same;

acquire a second set of applications each with the number of successively skipped times greater than a preset number, in which the applications each with the number of successively skipped times greater than the preset number need to be scanned and are to be scanned in a descending order of the numbers of successively skipped times, and the scanning priorities of applications with the same number of successively skipped times in the second set of applications are the same;

acquire a third set of applications each with a time difference between a present time and the time for the previous scanning greater than a preset time interval, in which the applications each with the time difference greater than the preset time interval need to be scanned and are to be scanned in a descending order of the time differences, and the scanning priorities of applications with the same time difference in the third set of applications are the same;

acquire a fourth set of applications each with the cache size for the previous scanning smaller than or equal to the preset cache size, in which the applications each with a cache size for the previous scanning smaller than or equal to the preset cache size need not to be scanned and are to be scanned in a descending order of the cache size if the applications in the fourth set of applications are to be scanned, and the scanning priorities of applications with the same cache size for the previous scanning in the fourth set of applications are the same;

acquire a fifth set of applications each with the number of successively skipped times smaller than or equal to the preset number, in which the applications each with a great number of successively skipped times smaller than or equal to the preset number need not to be scanned and are to be scanned in a descending order of the numbers of successively skipped times if the applications in the fifth set of applications are to be scanned, and the scanning priorities of applications with the same number of successively skipped times in the fifth set of applications are the same;

determine that the scanning priorities of a sixth set of applications in the list of applications to be scanned and beyond the first to fifth sets of applications are the same and the sixth set of applications need not to be scanned.

8. The electronic device according to claim 7, wherein the processor is further configured to:

sort the list of applications to be scanned in a descending order of the scanning priorities.

9. The electronic device according to claim 7, wherein processor is further configured to:

update the cache size and the time for the previous scanning and the number of successively skipped times of each application according to a scanning result after the scanning of respective application ends.

10. The electronic device according to claim 6, wherein processor is further configured to:

query the historical scanning record corresponding to a package name of each application according to the package name of each application.

11. A non-transitory computer-readable storage medium having instructions stored thereon, wherein when the instructions are executed by a processor, the processor is caused to perform the method for scanning cache of an application installed on an electronic device, the method comprising:

acquiring, by the processor, a list of applications to be scanned;

querying, by the processor and in a database stored in the electronic device, a historical scanning record of each application in the list of applications to be scanned;

determining, by the processor, a scanning priority of each application and whether the application needs to be scanned according to the historical scanning record of each application;

scanning, by the processor, applications that need to be scanned in the list of applications to be scanned in a descending order of the scanning priorities, so as to acquire cache sizes of respective applications that need to be scanned; and scanning, by the processor, applications that need not to be scanned in the list of applications to be scanned in a descending order of the scanning priorities, so as to acquire cache sizes of respective applications that need not to be scanned, and finishing the scanning until a preset scanning duration is reached or a preset scanning ending condition is satisfied, wherein the historical scanning record comprises a cache size and a time for a previous scanning and a number of successively skipped times.

\* \* \* \* \*